United States Patent

[11] 3,550,752

[72] Inventor Vaughn Gregor
 5524 Green Oak St., Hollywood, Calif. 90028
[21] Appl. No. 774,418
[22] Filed Nov. 8, 1968
[45] Patented Dec. 29, 1970

[54] AUTOMATIC STORAGE SYSTEM FOR NON-FREE FLOWING PRODUCTS
 18 Claims, 9 Drawing Figs.
[52] U.S. Cl. .................................................. 198/106, 198/147
[51] Int. Cl. ...................................................... B65g 37/00
[50] Field of Search.......................................... 198/48, 44, 43, 53, 57, 145, 147, 45, 47, 75, 106; 214/17.62, 17.6

[56] References Cited
UNITED STATES PATENTS

| | | | |
|---|---|---|---|
| 725,573 | 4/1903 | LeGrand ...................... | 198/146 |
| 1,501,622 | 7/1924 | Ruau............................ | 214/17.(62) |
| 2,638,248 | 5/1953 | Alvord......................... | 214/17.(62) |
| 2,890,803 | 6/1959 | Vanier.......................... | 198/57 |
| 3,319,808 | 5/1967 | Sackett......................... | 214/17.(62) |

Primary Examiner—Richard E. Aegerter
Attorney—Berman, Davidson and Berman

ABSTRACT: An automatic storage system for nonfree flowing products, such as cookies, cereals, bread stuffing, noodles, and similar products of irregular shape, for accepting the products at varying rates and for discharging the products, on demand. The apparatus includes a large horizontally extending storage chamber provided with a conveyor belt. The conveyor belt discharges the product at one end of the storage chamber into a transverse end chute feeding packaging machines. The storage chamber is supplied by a bucket conveyor arranged longitudinally at one side above the storage chamber, the bucket conveyor discharging into a transverse overhead feed chute reciprocating longitudinally over the storage chamber. A height sensor in the storage chamber controls the operation of the overhead chute. A photoelectric sensing system is provided in the transverse end chute controlling the conveyor belt in the storage chamber so as to prevent overloading the transverse end chute. The transverse overhead feed chute and the transverse end chute are respectively provided with vibrators to maintain the material therein in a fluent condition.

INVENTOR.
VAUGHN GREGOR,
BY
ATTORNEYS.

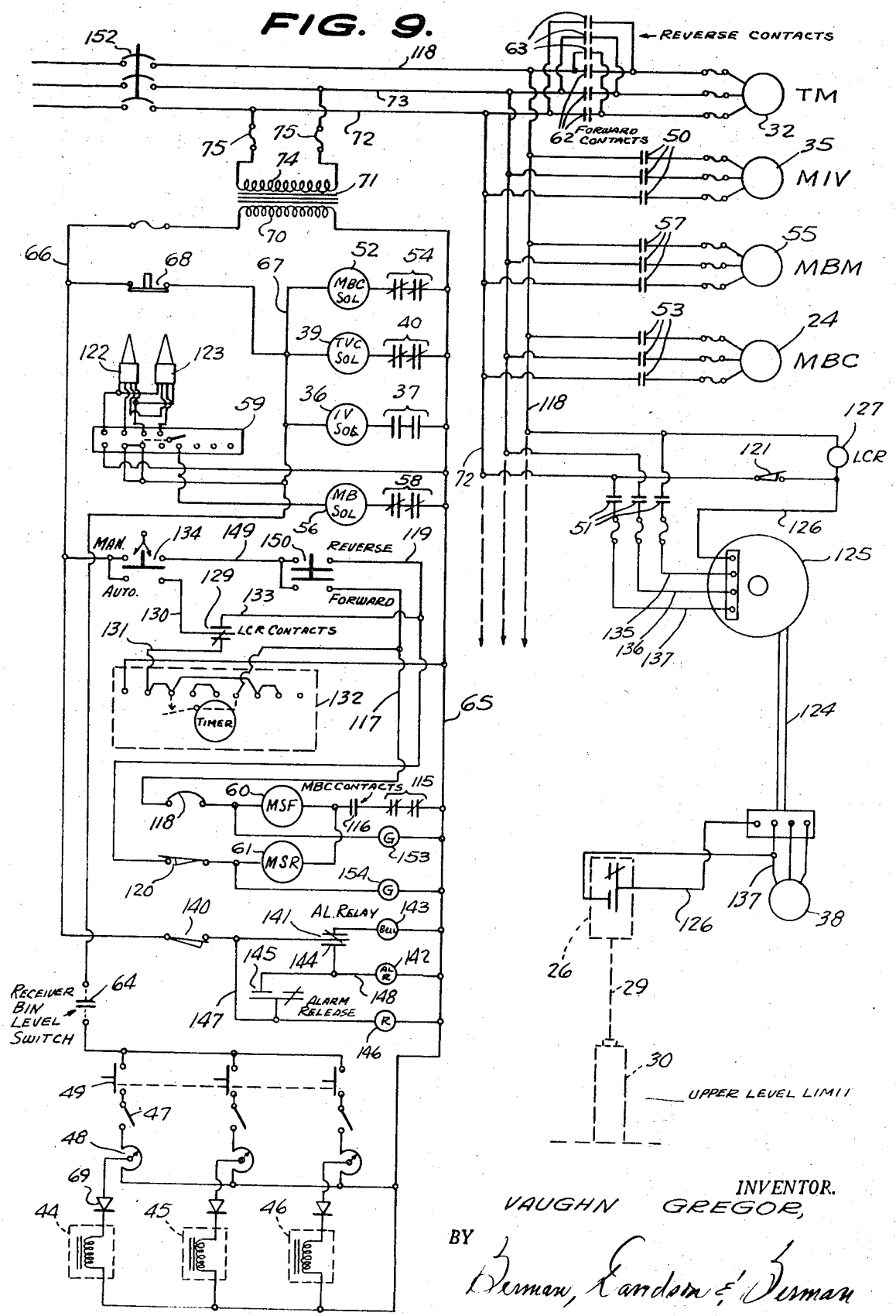

AUTOMATIC STORAGE SYSTEM FOR NON-FREE FLOWING PRODUCTS

This invention relates to material-handling apparatus, and more particularly to an automatic storage system for nonfree flowing products, such as cookies, cereals, bread stuffing, noodles, and similar products of irregular shape, for accepting the products at varying rates and for discharging the products, on demand.

A main object of the invention is to provide a novel and improved automatic storage or accumulation system for nonfree flowing products of irregular shape, for accepting the products at varying rates, and for discharging the products on demand, the apparatus being relatively simple in construction, being reliable in operation, and being relatively compact in size so as to occupy a relatively small amount of floor space.

A further object of the invention is to provide an improved automatic storage system that accepts products at varying rates and discharges products on demand, the apparatus being relatively inexpensive to fabricate, being durable in construction, being easy to maintain in a clean condition, and requiring a minimum amount of human supervision.

A still further object of the invention is to provide an improved automatic storage or accumulation system for various materials, such as food products of irregular shape which are processed at varying rates and which must be stored between the processing and packaging thereof, the apparatus being substantially fully automatic, providing safe handling of the material accepted thereby and delivered therefrom, and providing a smooth flow of material therefrom to the associated packaging machines employed.

A still further object of the invention is to provide an improved automatic storage system for conveying products, such as cookies, cereals, bread stuffing, noodles, or other objects of irregular shape and for feeding the material to associated packaging machines, the apparatus being arranged so that the material is fed therefrom as required and without overloading the packaging machines receiving the same, and the apparatus operating in a manner such that the material is circulated through the system in a controlled manner and without the possibility of substantial quantities thereof being trapped therein and bypassed.

A still further object of the invention is to provide an improved automatic storage and accumulation system for non-free flowing products, the system providing smooth and efficient handling of the products with minimum breakage or damage thereto and at relatively low handling costs, as well as simplifying scheduling and supervision, and facilitating improved quality control.

Further objects and advantages of the invention will become apparent from the following description and claims, and from the accompanying drawings, wherein:

FIG. 9 is a schematic wiring diagram showing the electrical connections of the control elements employed with the apparatus of FIGS. 1 to 8.

Figure 1:
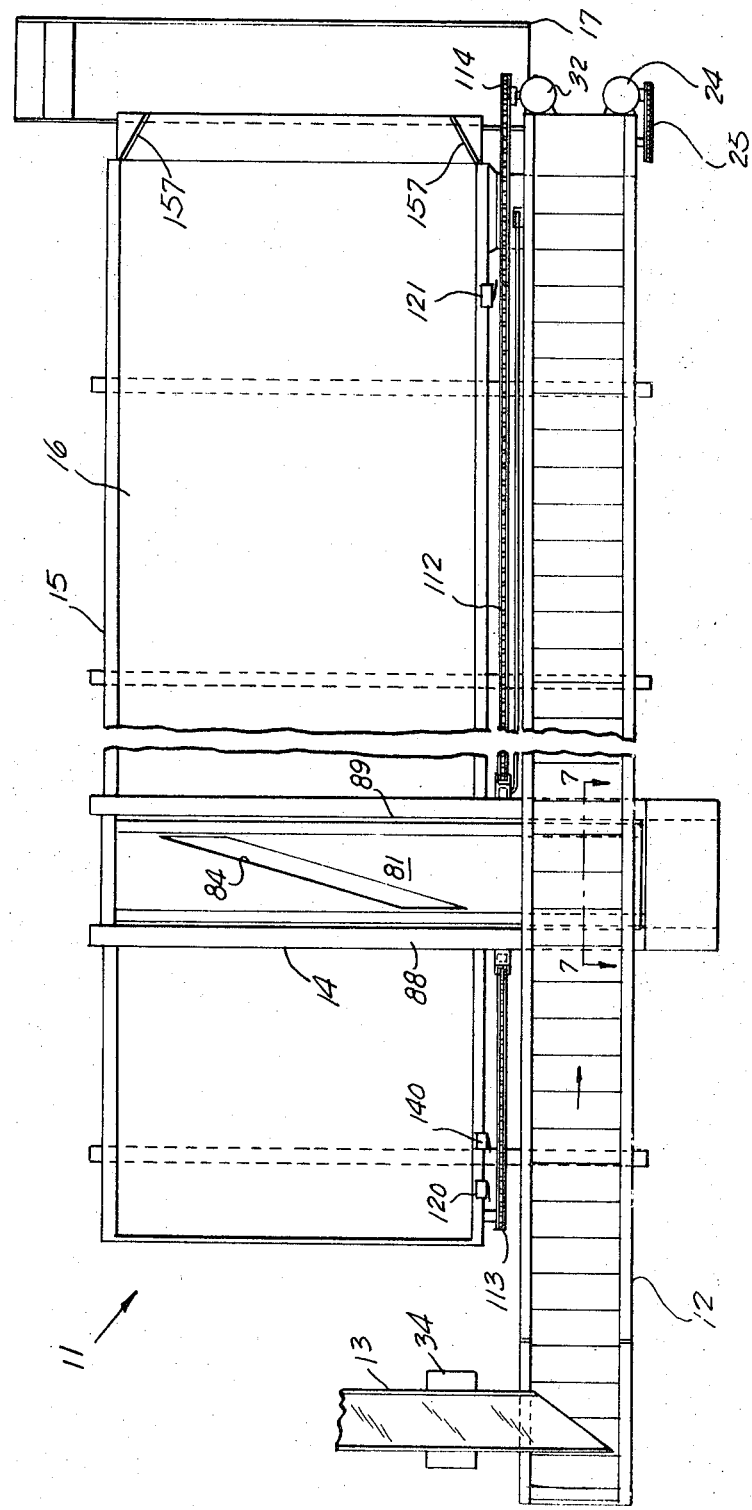
FIG. 1 is a top plan view of an automatic accumulation and storage apparatus according to the present invention, shown partly broken away.

Referring to the drawings, 11 generally designates an improved automatic storage or accumulation system constructed in accordance with the present invention. The main general components of the system 11 comprise a longitudinally and horizontally extending elevated bucket conveyor 12 which receives the material to be accumulated from a delivery chute 13 which may be located anywhere along the bucket conveyor 12, and is illustrated by way of example as being located adjacent the left end of the conveyor 12, as shown in FIG. 1. The bucket conveyor 12 is arranged in a manner to be presently described in detail to deliver material to a reciprocating transversely extending feed chute assembly generally designated at 14 which reciprocates longitudinally over the main storage compartment of the system, designated generally at 15. The bottom wall of the main storage chamber 15 comprises a longitudinally extending belt conveyor 16 which discharges, on demand, in a manner presently to be described, into a transverse end chute assembly, designated generally at 17, which feeds the products to packaging machines, not shown.

As will be presently explained, appropriate parts of the system 11 are provided with vibrator means to maintain the products contained therein in a fluent condition and to facilitate the movement of the products therethrough. Also, various sensing devices are provided at appropriate locations in the system to maintain a suitable amount of material in the main storage chamber 15 and to move material therefrom to the output delivery chute 17 as required. In general, the system 11 transfers material supplied to the bucket conveyor assembly 12 to the transverse longitudinally reciprocating overhead feed chute assembly 14 which travels longitudinally back and forth over the main storage compartment 15 and allows material to flow by gravity into the storage compartment in a manner to evenly distribute the material in the storage compartment. The belt conveyor 16 feeds the material to the transverse output delivery chute 17 as required, namely, in accordance with the presence or absence of material in the chute, as will be presently explained, the capacity of the storage compartment 15 being sufficient to ensure that the material will be delivered to the output chute 17, as required by the demand developed by the packaging machines which are supplied by said output chute 17.

Figure 7:
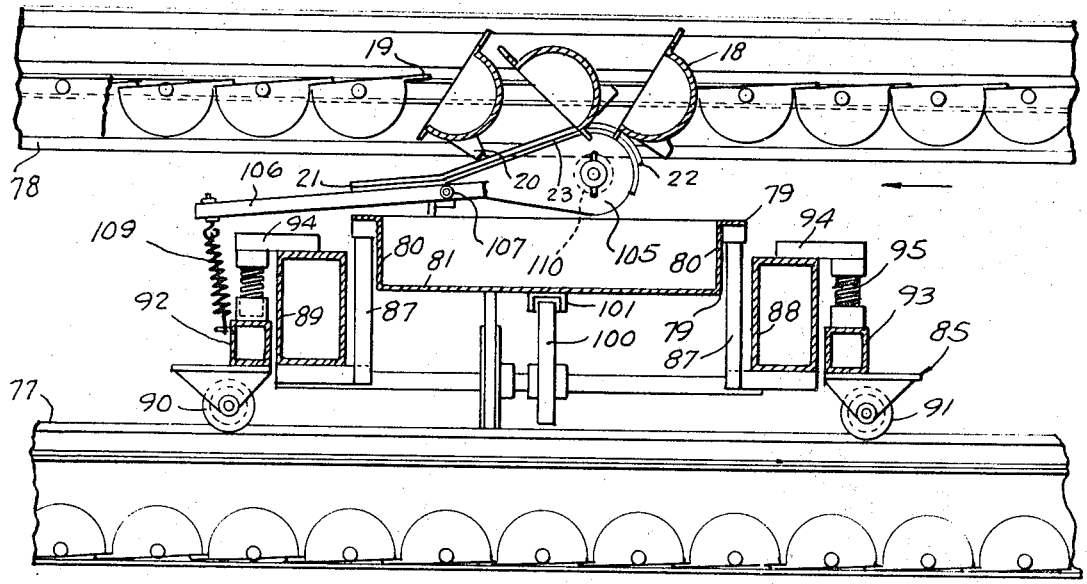
FIG. 7 is a fragmentary vertical cross-sectional view taken substantially on the line 7—7 of FIG. 6.

The bucket conveyor assembly 12 is of conventional construction, per se, and is of the endless-loop type, comprising successive transversely arranged, transversely pivoted buckets 18 which are biased by gravity so that the buckets tend to assume horizontal positions in the upper run of the buckets, as shown in FIG. 7, each bucket being provided with a rearwardly projecting lip, or flange 19 which overlies the forward margin of the rearwardly adjacent bucket in a normal horizontal position of the buckets. Each bucket is provided with a depending end lug 20 which cooperates with ramp means, presently to be described, to tilt the associated bucket to a discharged position as the bucket passes over the ramp means, for example, as the bucket travels to the left, as viewed in FIG. 7, the bucket returning to its original upwardly facing position after it passes over and leaves the ramp means. As will be presently explained, the ramp means is carried by the reciprocating transversely extending distributing chute assembly 14 and comprises a camming track 21 having an upwardly convex leading portion 22 which is of generally arcuate shape and which merges with a relatively linear downwardly and rearwardly inclined release portion 23 which cooperates with the lugs 20 to gradually allow the buckets to resume their normal upwardly facing positions as they pass over the camming track member 21. The buckets travel at a rate sufficiently rapid as to substantially exceed the rate of longitudinal movement of the transversely extending distributing chute assembly 14 so as to provide the above-described automatic tilting of the buckets as they pass over the distributing assembly 14. Thus, the bucket conveyor assembly 12 includes a drive motor 24 which is drivingly coupled by suitable sprocket chain means 25 to the driving roller of the bucket conveyor, shown at the right end thereof in FIG. 1.

Figure 4:
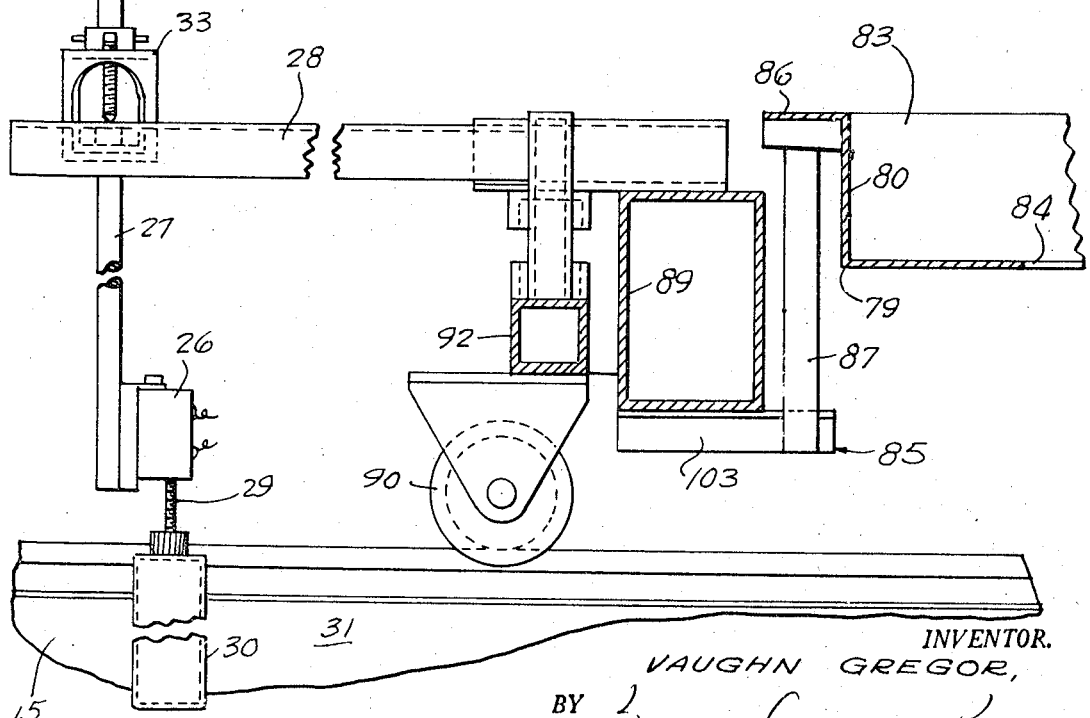
FIG. 4 is an enlarged fragmentary vertical cross-sectional view taken substantially on the line 4—4 of FIG. 3.

As will be presently explained, the movement of the transversely extending distributing chute assembly 14 is controlled by the accumulation of the product in the storage compartment 15 in a manner to provide even distribution of the product in the compartment. Thus, the drive motor for the traveling distributing chute assembly 14 is shown at 32, and the energizing circuit for said drive motor includes a microswitch 26 mounted on the lower end of vertical bar 27 which is adjustably secured to a longitudinally bar member 28 projecting from the frame of the distributing chute assembly 14, as shown in FIG. 4. The vertical bar 27 is adjustably mounted on bracket means 33 which can be adjusted longitudinally along the length of the bar 28 and which includes suitable means allowing the adjustment of the vertical bar 27 up or down. Also, the bracket means 33 includes means for adjusting the position of the vertical bar 27 in a direction parallel to the transverse distributing chute 14. The microswitch 26 is provided with the depending operating rod 29 to the lower end of which is secured a sensor 30 adapted to contact material 31 accumulating in the compartment 15. The material, after building up on the conveyor belt 16 in the bottom of the compartment 15, engages the sensor 30, which, in turn, causes the microswitch 26 to close and energize the motor 32, causing the distributing chute assembly 14 to move until the probe 30 moves away from the pile of material 31 and is thereby released, causing the microswitch 26 to open and deenergize motor 32. When the level of the material rises so as to again engage the probe 30, the above-described process is repeated. To be presently explained, the motor 32 is cycled in a specific manner, including the provision of a timed delay, or dwell period, before the resumption of forward movement of the transverse overhead distributing chute assembly 14.

In view of the nature of the material to be handled by the system, certain of the conveying elements thereof are provided with suitable vibrators. Thus, as above-mentioned, the apparatus is intended to handle solid material of irregular shape, such as breakfast food, or the like, and in order to maintain fluency of the material it must be vibrated. Thus, the inlet conveyor chute 13 is provided with a conventional vibrator 34 driven by a motor 35 (see FIG. 9), motor 35 being controlled, in turn, by a conventional electromagnetic contactor 36 of the solenoid type. The use of the inlet vibrator 34 is optional, and, therefore, the circuit of the controller 36 is provided with normally open manually operated switch means indicated diagrammatically at 37 in FIG. 9.

The transversely extending chute assembly, or "tracer" assembly 14 is likewise provided with vibrating means, presently to be described in detail, driven by a motor 38 carried on the assembly 14 and controlled by a conventional electromagnetic controller 39. As shown in FIG. 9, the circuit branch including the electromagnetic controller 39, which is of the solenoid type, contains normally closed manually operated switch means 40 which may be employed, at times, to deenergize the contactor 39, is so desired.

The delivery chute 17 has a downwardly and outwardly inclined bottom wall 43 (see FIG. 3), which is likewise provided with vibrator means comprising three longitudinally spaced electromagnetic vibrators 44, 45 and 46 which, respectively, have independently controlled energizing circuits, as shown in FIG. 9. Thus, each of the energizing circuits for these vibrators 44, 45 and 46 includes a selector switch 47 and an intensity-regulating potentiometer 48, the three circuits being arranged for simultaneous closure, assuming that their selector switches 47 are closed, by the provision of a push button manually operated ganged switch assembly 49. The potentiometers 48 may be of the conventional commercial type known as "Powerstats."

The contacts of the inlet vibrator electromagnetic controller 36 are shown at 50 in FIG. 9. Similarly, the contacts of the magnetic controller 39 associated with the "tracer" vibrator motor 38 are shown at 51 in FIG. 9.

The bucket conveyor motor 24 is controlled by a conventional electromagnetic controller 52 having the contacts 53 shown in FIG. 9, the controller 52 being connected in a circuit including normally closed manually controlled switch means 54. The main belt conveyor 16 is driven by a motor 55 controlled by an electromagnetic controller 56 having the contacts 57 shown in FIG. 9. The energizing circuit for the electromagnetic controller 56 includes the manually controlled normally closed switch means 58, as well as the contacts of a photoelectric relay means 59 which responds to the presence or absence of material in the output delivery chute assembly 17 in a manner presently to be described.

The drive motor 32 for the transverse overhead distributing chute assembly 14 is of the reversible type and is reversibly controlled by respective forward and reverse electromagnetic controllers 60 and 61, the contacts of the "forward" controller 60 being shown at 62 in FIG. 9, and the contacts of the "reverse" controller 61 being shown at 63 in FIG. 9.

As shown in FIG. 9, the discharge hopper vibrators 44, 45 and 46 are controlled not only by the operation of their selecting switches 47 and common manually operated control switch 49, but also by a level-responsive switch 64 located in the receiver bin of the associated packaging machine, or other apparatus being supplied from the assembly 11. The switch 64 closes when the level of material in the aforesaid receiving bin rises to a predetermined height, and conversely, said switch 64 opens when the level of material in the receiver bin drops below said height. Thus, although the switch 64 is diagrammatically illustrated in FIG. 9, it is, in actuality, located in the receiving bin of the apparatus being supplied by the device 11 and external thereto. The vibrator intensity-control potentiometers 48 are connected between a first current-supply wire 65 and a second current-supply wire 66 through the selector switches 47, the poles of the common manually operated control switch 49, the bin-level switch 64, a wire 67, and a manually operated control switch 68, also employed to control the operation of the electromagnetic switching devices 52, 39, and 36, said switching devices being connected between wire 67 and wire 65 through their associated individual control switch assemblies 54, 40, and 37, respectively. The respective vibrators 44, 45 and 46 are connected between the wire 65 and the sliding contacts of their associated potentiometers 48 through respective rectifiers 69. The supply wires 65 and 66 are connected to the terminals of the secondary winding 70 of a transformer 71 whose primary winding has its terminals connected, respectively, to two of the supply wires 72 and 73 of a conventional three-phase supply source. Thus, as shown in FIG. 9, the primary winding 74 of transformer 71 is connected through appropriate fuses 75, 75 to the line wires 72, 73, whereby single-phase power is furnished to the secondary wires 66 and 65 for energizing the discharge vibrators 44, 45 and 46 and for similarly energizing the electromagnetic switching devices 52, 39, 36 and 56, as well as the "forward" and "reverse" electromagnetic switching devices 60 and 61 associated with the reversible motor 32 employed to drive the transversely extending overhead distributing chute 14.

Figure 6:
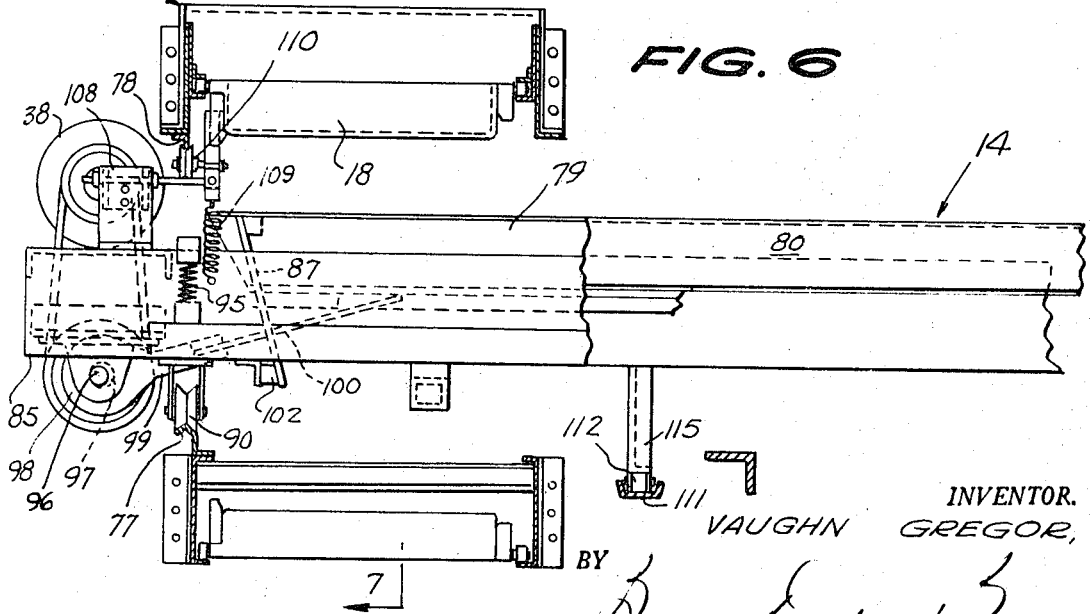
FIG. 6 is a fragmentary vertical cross-sectional view taken substantially on the line 6—6 of FIG. 5.

The main frame of the apparatus 11, shown at 76, includes a bottom longitudinal supporting track 77 of inverted V-shape, as shown in FIG. 6, and an upper longitudinal track 78 comprising a right-angled bar vertically aligned with the track 77. As shown in FIG. 6, the vertically aligned tracks 77 and 78 are located in a longitudinal vertical plane substantially at the rear margin of the bucket conveyor 12. The transversely extending distributing chute assembly 14 comprises an upwardly facing transversely extending pan 79 having the longitudinal walls 80, 80, the bottom wall 81, the front transverse end wall 82, and the rear transverse end wall 83. The bottom wall 81 is provided with the diagonally extending distributing slot 84 overlying the main belt conveyor 16, as is clearly shown in FIG. 1. The pan 79 is resiliently supported on a carriage, designated generally at 85, said carriage being, in turn, movably engaged with and supported by the vertically aligned longitudinal track members 77 and 78. Thus, the longitudinal sidewalls 80 of the pan 79 have horizontal flanges 86, and a plurality of upstanding leaf springs 87 are secured on and carried by the carriage 85, the top ends of the leaf springs being secured to the flanges 86, thus providing resilient support for the pan 79 on carriage 85. The carriage 85 includes longitudinally extending hollow frame bars 88 and 89 extending on opposite sides of the pan 79, the previously mentioned horizontal bar 28 being rigidly connected to the frame bar 89, as shown in FIG. 4. Respective supporting rollers 90 and 91 are journaled to outer longitudinally extending carriage frame bars 92 and 93, the rollers being peripherally V-grooved and being engaged on the bottom supporting track 77. The main longitudinally extending carriage frame bars 89 and 88 are provided with top arms 94 projecting outwardly therefrom, said top arms being supportingly connected to the outer frame bars 92 and 93 by suitable cushioning spring members 95.

The "tracer" vibrator motor 38 is mounted on the end portion of the frame of carriage 85, rearwardly subjacent the bucket conveyor 12, as shown in FIG. 6. The vibrator motor 38 is drivingly coupled to a shaft 96 journaled beneath the rear end of carriage 85 and having an eccentric element 97 rotatably engaged in the hub portion 98 of an eccentric arm 99 connected by a leaf spring 100 to a bottom channel 101 secured to the bottom surface of the main horizontal wall 81 of pan 79. As shown in FIGS. 6 and 7, the eccentric drive arm 99 and leaf spring 100 are located in the longitudinal vertical plane of the pan 79 so that the pan is oscillated longitudinally responsive to the rotation of the eccentric element 97 as it is driven by motor 38. The longitudinal oscillation, or vibration, of pan 79 is permitted by the flexibility of the leaf springs 87 connecting pan 79 to the remainder of carriage 85.

The top and bottom ends of the leaf springs 87 are resiliently connected, respectively, to the flanges 86 and main frame bars 88—89 by means of rubber connecting blocks 102. Thus, the bottom ends of the leaf springs 87 are connected through rubber blocks 102 to angle bars 103 secured transversely to the bottom walls of the hollow main carriage frame bars 88—89, and the top ends of the leaf springs 87 are secured through similar blocks to the bottom surfaces of the longitudinal top flanges 86 of the pan sidewalls 80.

The bucket-tilting cam member 21 is secured on the top edge of a vertical plate member 105 conforming in contour with the working portion of the cam member 21, said plate member 105 being, in turn, secured to a bar member 106 which is pivoted at 107 to the rear end portion of the carriage 85 by means of a pivot bracket 108 secured on the carriage, and a pivot pin rotatably mounted in said bracket. The pivot pin, shown at 107, thus supports the arm 106 and the plate member 105 for rotation transverse to the longitudinal direction of pan 79, said elements being biased in a counterclockwise direction, as viewed in FIG. 7, by a coiled spring 109 connecting the outer end of arm 106 to the subjacent carriage frame bar 92. Journaled to the plate member 109 substantially concentrically relative to the arcuately curved cam portion 22 is a peripherally grooved roller 110 which interengages with track 78, being biased into such engagement by the biasing action of spring 109.

Figure 2:
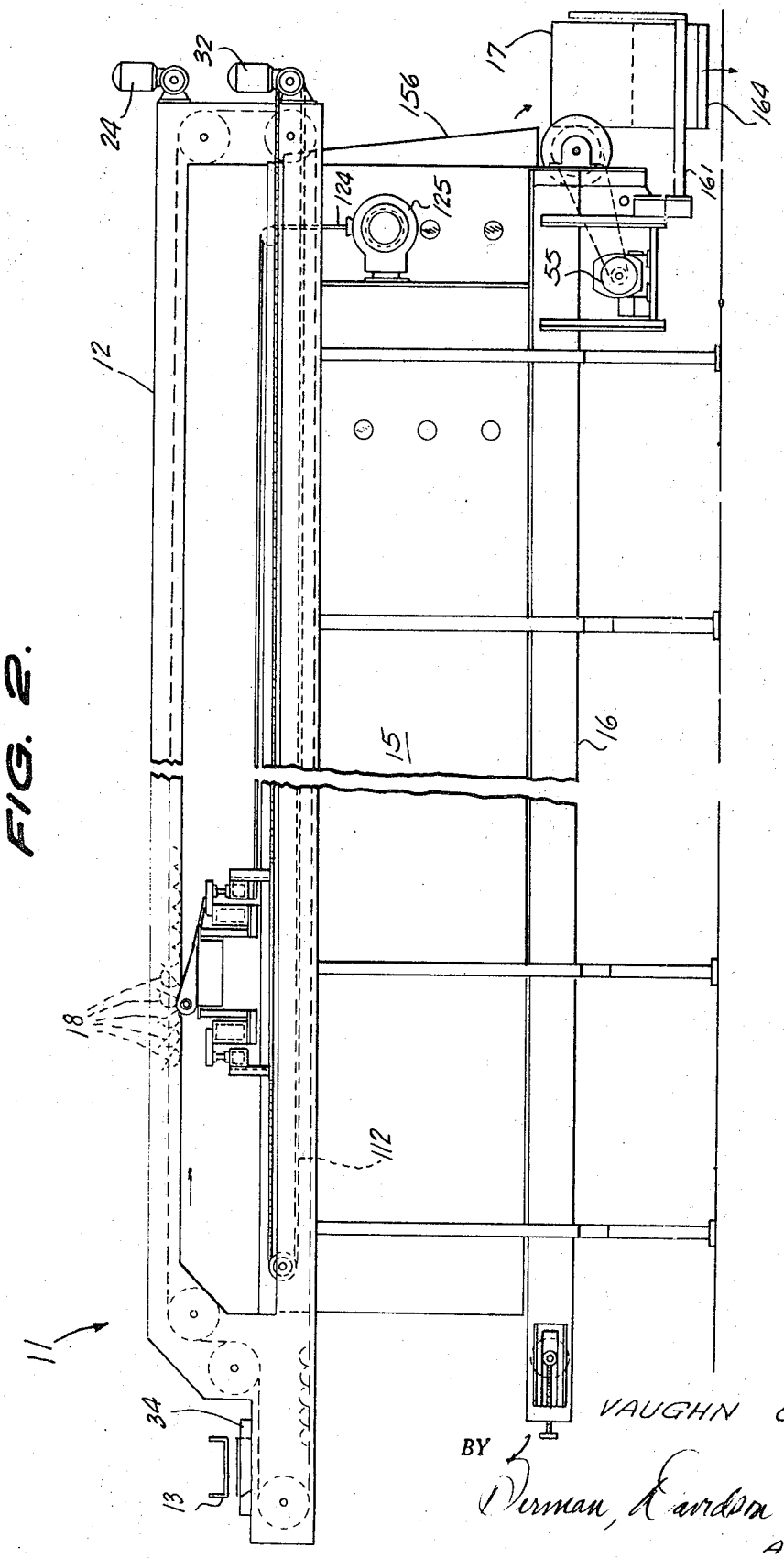
FIG. 2 is a side elevational view of the apparatus of FIG. 1.

The main frame 76 of the apparatus 11 is provided with an upwardly facing horizontal channel bar 111 extending parallel to the bucket conveyor 12 and located beneath the transversely extending distributor chute assembly 14, the channel bar 111 being located between the vertical plane of the rear longitudinal wall of the main storage compartment 15 and the longitudinal vertical plane of the front margin of the bucket conveyor 12. The top run of a sprocket chain 112 is slidably supported on the channel member 111, said chain extending around opposite sprocket wheels 113 and 114 located adjacent the opposite ends of the main storage compartment 15, as shown in FIG. 1. The sprocket wheel 113 is journaled to the main storage compartment 15 adjacent its left end, as viewed in FIG. 1, namely, adjacent the inlet chute 13. The opposite sprocket wheel 114 is carried on the shaft of reversible motor 32. As shown in FIG. 2, the motor 32 is mounted on the main frame 76 adjacent and below the right end of the bucket conveyor 12. The ends of the sprocket chain 112 are respectively connected to depending legs 115' carried by the carriage 85, said legs being slidably and supportingly engaged in the channel 111, as well as being connected to the sprocket chain 112.

It will thus be seen that when the motor 32 is energized, the transversely extending chute assembly 14 is moved in a longitudinal direction over the main storage compartment 15, the direction of movement being determined by the direction of energization of motor 32, which is, in turn governed by the energization of either the forward electromagnetic switch device 60, or the reverse electromagnetic switch device 61. The energization of motor 32 is also controlled by manually operated switch means 115 and by a set of contacts 116 controlled by the switch solenoid device 52 associated with main bucket conveyor 12. Thus, as shown in FIG. 9, the electromagnetic switch device 60 is connected between a wire 117 and the wire 65 through a jumper wire 118, the contacts 116 and the manually operated switch means 115. The contacts 62 of the switch device 60 are connected in series with the respective phase windings of motor 32 and the respective line wires, shown at 72, 73 and 118.

The reversing electromagnetic switch device 61 is connected between a wire 119 and the power-supply wire 65 through a limit switch 120, the contacts 116 of the bucket conveyor, and the manually controlled switch means 115. As shown in FIG. 9, the limit switch 120 is normally closed and opens responsive to engagement by the carriage assembly 85 so as to prevent excessive reverse movements of the carriage. Accordingly, the limit switch 120 is located with its operating element in the path of movement of the carriage 85 at a location near the rear end of the storage compartment 15, for example, approximately twelve inches from the rear end wall of said storage compartment. A similar, but normally open, limit switch 121 is located near the forward end of the main storage compartment 15 in the path of movement of carriage assembly 85, arranged to be closed when the carriage assembly approaches said said forward end of the main storage compartment 15. For example, the limit switch 121 may be located approximately 30inches from the forward end of the track 77 near the forward, or discharge, end of main storage compartment 15.

As shown in FIG. 9, the electromagnetic switch device 56 which controls the motor 55 of the main belt conveyor 16 is connected between wire 65 and wire 67 through a conventional photoelectric relay assembly 59 and the manually controlled switch means 58. The photoelectric relay assembly 59 is controlled by a pair of vertically spaced level-detecting photocell assemblies 122 and 123 mounted in the discharge, or delivery chute 17. The function of the photoelectric detectors 122 and 123 and the associated photoelectric relay assembly 59 is to stop the main conveyor motor 55 when a product pours into the discharge chute 17 to an upper limiting height and to start it again after the product has been discharged from the delivery chute 17 as a result of its vibration by means of its associated electrically driven vibrator means. Thus, the relay unit 59 is of conventional structure and is so arranged that the electromagnetic switch device 56 will become energized when the level of material in the discharge chute 17 drops below a predetermined bottom-limiting level and will remain energized until the level of material in the chute 17 rises above an upper limiting level, the decrease below the lower limiting level being detected by the photocell unit 123 and the rise of the level of material above the upper predetermined level being detected by the photocell unit 122.

As above-mentioned, the vibration of the discharge chute 17 is produced by the action of the vibrating units 44, 45 and 46.

The energizing wires for the vibrator motor 38, which is mounted on the longitudinally reciprocating distributing chute assembly 14 are contained in a flexible cable 124, and are carried on a spring-actuated, self-winding reel assembly 125 of conventional construction, allowing the cable 124 to wind on, or unwind from the reel 125 in accordance with the movements of the assembly 14. The cable 124 also includes a control wire 126 associated with a reversing relay 127 of a single-pole, double-throw type having the contacts shown at 129 in FIG. 9. The relay 127 in its normally deenergized condition has its contacts so connected that normally the pole of the relay connects a wire 130 to one of the input wires 131 leading to a conventional timer 132. The timer 132 is of conventional construction and essentially is a normally closed switch device whose contacts open when the device is deenergized and which require a predetermined period of time to reclose after the timer is reenergized.

As shown in FIG. 9, the relay 127 has its winding connected across the line wires 72 and 118 through the limit switch 121, whereby the relay becomes energized when the limit switch 121 is closed. Energization of the relay 127 causes the pole of its contacts to disconnect wire 131 from wire 130 and to connect wire 130 to wire 133. The wire 119 is connected through wire 133 and the relay contacts 129 (in the energized condition of relay 127), and through wire 130 and a manually controlled switch 134 to the wire 66. It will thus be seen that with the control switch 134 closed, closure of limit switch 121 causes relay 127 to become energized and, therefore, deenergizes the "forward" electromagnetic switch device 60 by the opening of the timer switch contacts while, at the same time, switches on the electromagnetic control device 61 associated with the "reverse" movement of the "tracer" assembly 14, causing reverse movement of said assembly 14 and releasing the limit switch 121. The release of relay 127 caused by the opening of limit switch 121 returns contacts 129 to their normal positions, but the device 60 does not become reenergized until the period of time required for the contacts of timer 132 to reclose, whereby to reestablish the connection of the wire 117 to the wire 66.

The cable 124 contains not only the wires 135, 136 and 137 connected to line wires 118, 73 and 72 through the contacts 51 of electromagnetic switch device 39, but also contains the wire 126 leading to the pole of the switch assembly 26 controlled by the depth probe 30. As shown in FIG. 9, the switch 26 is connected in circuit between wire 126 and wire 137, whereby the closure of switch 26 acts in the same manner as the closure of limit switch 121, in a manner presently to be described.

An "alarm" limit switch 140 is mounted with its operating element in the path of movement of the carriage 85 at a location spaced a short distance forwardly of the reverse limit switch 120, as shown in FIG. 1. The "alarm" limit switch 140 is normally open, as shown in FIG. 9, and is connected between power-supply wire 66 and power-supply wire 65 through the normally closed contacts 141 of a single-pole, double-throw relay 142 and an alarm bell 143. When the relay 142 is energized the pole of its contacts disengages from its normal position and engages with the lower contact 144, shown in FIG. 9. This occurs in response to the closing of a manually operated pushbutton switch 145. The pushbutton switch 145 is mounted at a convenient location, for example, on the control panel of the device. As shown in Fig. 9, a suitable alarm lamp, such as a red lamp 146, is connected across wires 65 and 66 through the limit switch 40, the connection including a wire 147 between lamp 146 and limit switch 140. The relay 142 has its winding connected between wire 65 and wire 147 through the manually operated switch 145. The lower contact 144 of relay 142 is connected to the wire 148 which connects one terminal of the winding of relay 142 to the switch 145, said switch being, for example, of the single-pole, double-throw type, as shown, and being arranged to connect wire 148 to wire 147 when manually operated. When limit switch 140 closes responsive to the approach of carriage 85 to the rear end of the main storage compartment 15, the alarm bell 143 becomes energized from the power-supply wire 65 and 66. Simultaneously, the red alarm lamp 146 becomes energized. The operator may then actuate the pushbutton switch 145 to thereby energize relay 142, which remains energized as long as limit switch 140 is closed. Deenergization of relay 142 deenergizes the alarm bell 143, but retains the relay 142 energized as long as limit switch 140 is closed, even if the switch 145 returns to its normal open position as a result of being released. The relay 142 will remain energized and the red alarm lamp 146 will also remain energized until the carriage 85 moves forwardly so as to release limit switch 140.

A suitable circuit is provided for manually controlling the movement of the "tracer" unit 14. The manually operated switch 134 is of the two-position type, the lower operating position thereof being for "automatic" operation, and the upper operating position thereof being for "manual" operation. As shown in FIG. 9, the upper contacts of the control switch 134 are connected between supply wire 66 and a wire 149. A two-position reversing switch 150 is provided between wire 149 and the respective wires 117 and 119, as shown. The upper contacts of switch 150 are connected between wire 149 and wire 119, whereby to control the "reverse" electromagnetic switch device 61 whose contacts 63, when closed, energize the "tracer" unit motor 32 for reverse movement. The lower contacts of switch 150 are connected between wire 149 and wire 117, leading to the electromagnetic switch device 60 whose contacts 62, when closed, energize the motor 32 for forward movement of the "tracer" unit 14. Therefore, when the pole of the main control switch 134 is in its upper working position, bridging its upper contacts, the direction of movement of the "tracer" unit 14 can be manually controlled by operating the manual selecting switch 150. As previously mentioned, in order to operate the motor 32, the bucket conveyor motor must also be energized, since the energization of the electromagnetic switch devices 60 and 61 is subject to control by the contacts 116, which, in turn, are controlled by the electromagnetic switch device 52 associated with bucket conveyor motor 24.

In the ensuing description of operation, it will be assumed that the various main control switches are operated to place the system in a condition for "automatic" operation. Thus, the switch 68 will be assumed to be closed, and the switch 134 will be assumed to be in its "automatic" position with its pole bridging the lower contacts thereof shown in FIG. 9. The main circuit breaker, shown at 152, will also be assumed to be closed. Under these conditions, the respective motor-controlling solenoids 52 and 39 will be energized, and if the switch means 37 is likewise closed, the solenoid 36 will also be energized. The timer switch 132 will be in its normal closed position, whereby the electromagnet switch device 60 will be likewise energized, producing forward movement of the "tracer" assembly 14. It will be further assumed that the manually operated switch 49 is closed, as well as one or more of the vibrator-selecting switches 47.

Material is supplied from the inlet chute 13 to the bucket conveyor assembly 12, and the material is then delivered to the transversely extending "tracer" or distributing chute assembly 14 by the camming action of the member 21 on the bucket, as above-described. The assembly 14 will travel forwardly toward the discharge end of the main compartment 15 until it operates the limit switch 121, at which time the relay 127 becomes energized, causing the contacts 129 of the relay to reverse their positions, namely, causing the pole of the contacts to disengage from its lower contact and to engage its upper contact, thus disconnecting wire 131 from wire 130 and connecting wire 130 to wire 133. This energizes the "reverse" electromagnetic motor controller 61, thereby reversing the motor 32. The reverse movement of the carriage 85 releases the limit switch 121, causing the "tracer" assembly 14 to stop. The relay 127 is likewise deenergized and its contacts resume their normal positions wherein timer 132 again becomes energized. However, due to the delay period provided by the timer, an interval of time occurs before the "forward" electromagnetic switch device 60 becomes reenergized, causing the "tracer" assembly 14 to again move forward and repeat the previous cycle. However, this repetition depends upon the condition of the relay 127. If the level of the material in the main compartment 15 is relatively high, the switch 26 will retain the relay 127 energized and the "tracer" assembly 14 will continue to move reversely, namely, toward the rear end of the main storage compartment 15 until it operates the limit switch 120, whereby to deenergize the electromagnetic motor-control device 61 and stop the rearward movement of the "tracer" assembly 14. As the level of the material beneath the probe 30 reduces, eventually it lowers sufficiently to restore the switch 26 to its normal open position, allowing the relay 127 to become deenergized and allowing the contacts 129 of said relay to return to their normal positions shown in FIG. 9, wherein the timer 132 is reenergized. After the dwell period of the timer 132 has elapsed, the "forward" motor-control device 61 becomes reenergized and causes the assembly 14 to move forwardly.

It will be noted that a reciprocatory cycle of movement of the assembly 14 will occur by the action of the probe device 30 in a manner similar to that which occurs when the front limit switch 121 is actuated. Thus, the operation of the apparatus is such as to cause the "tracer" assembly 14 to pause at locations where the level of the material is low so as to build up the level of material, as required As shown in FIG. 9, respective signal lamps 153 and 154 are connected between supply wire 65 and wire 117 and supply wire 65 and wire 119 (through limit switch 120). In other words, when the "forwad" electromagnetic controller 60 is energized, the signal lamp 153, which may be a green lamp, will be likewise energized. Similarly, the signal lamp 154 will be energized concurrently with the energization of the reverse controller 61.

Figure 8:
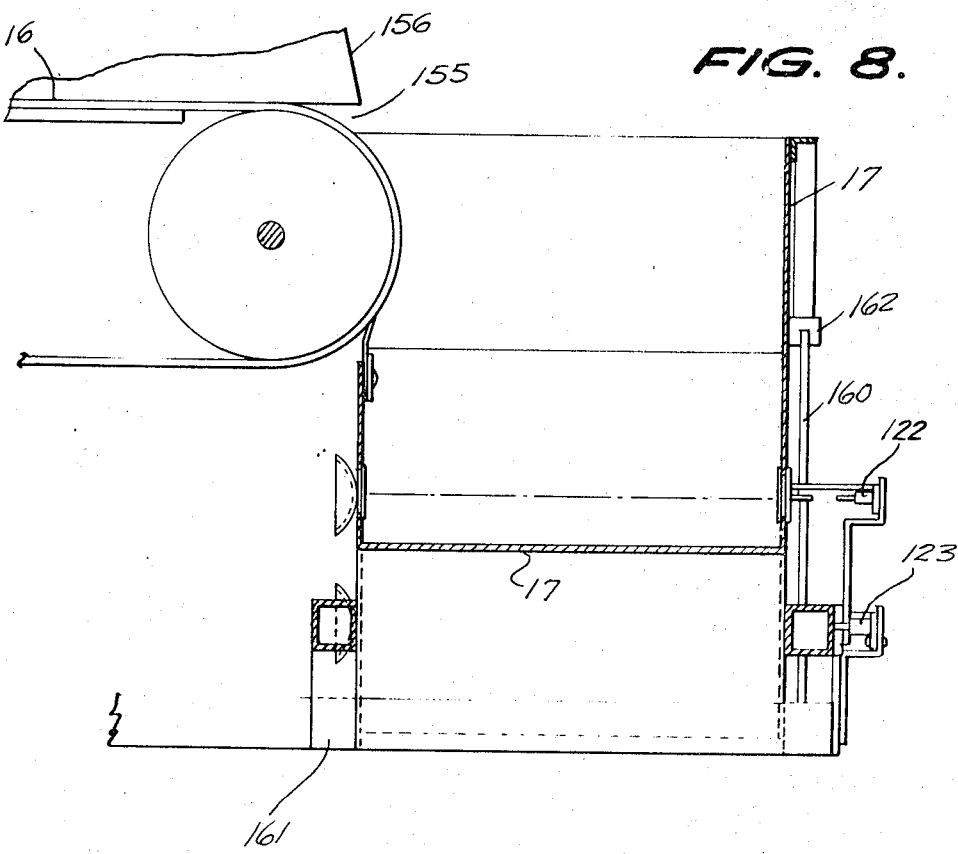
FIG. 8 is an enlarged fragmentary vertical cross-sectional view taken substantially on the line 8—8 of FIG. 3.
Figure 5:
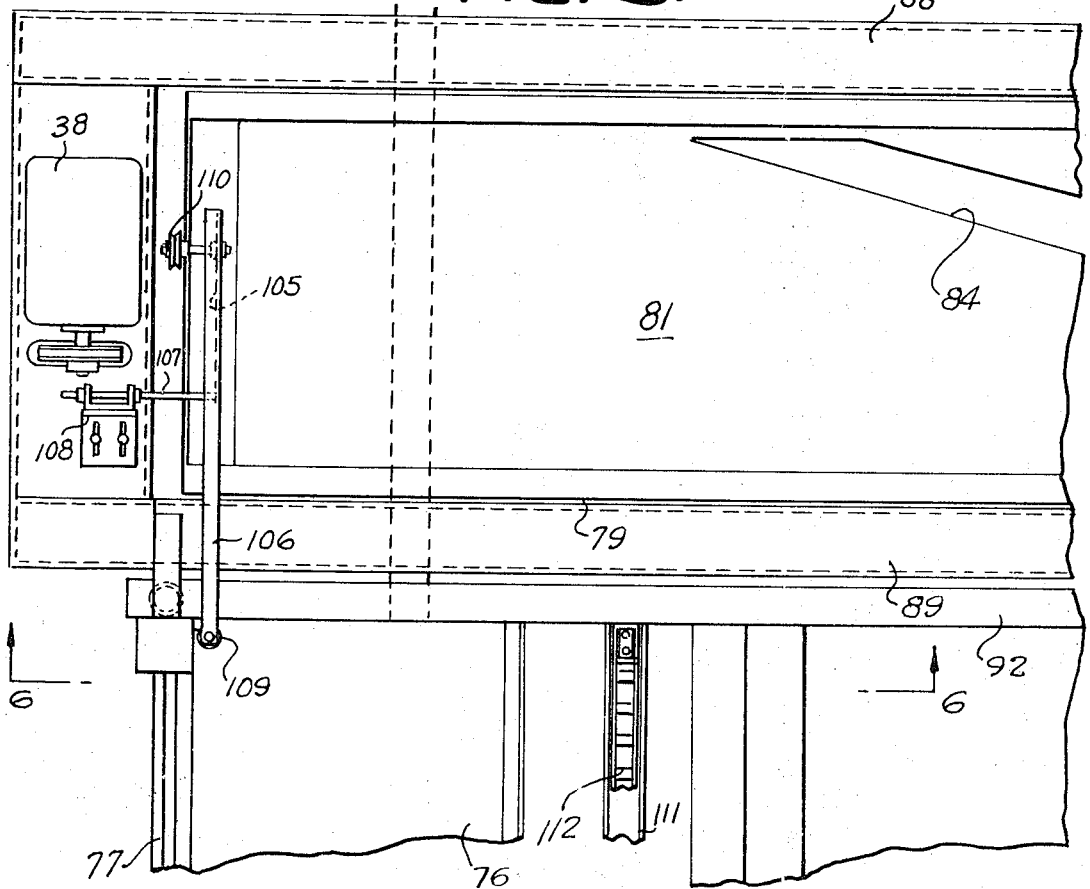
FIG. 5 is an enlarged fragmentary horizontal plan view taken substantially on the line 5—5 of FIG. 3.

The forward end of the main storage compartment 15 is suitably constructed to allow the discharge of material from the forward end of the conveyor belt assembly 16 into the transversely extending discharge chute assembly 17. Thus, as shown in FIG. 8, a discharge space 155 is provided between the bottom edge of the front wall of the main storage compartment 15 and the delivery end of the belt conveyor to allow the material to flow therebetween into the delivery chute 17. The forward end wall of the compartment 15 preferably slopes downwardly and forwardly, as shown at 156, and the forward portion of the compartment adjacent front wall 156 is provided preferably with forwardly convergent side baffles 157, 157 to facilitate the guiding of the material discharged through the space 155 into the transverse discharge chute 17.

From the above description it will be apparent that during the operation of the device 11 the continuous-discharge loop-type bucket conveyor 12 delivers material into the transversely extending chute assembly 14 by the tilting action of the buckets 18, as above-described the material discharging by gravity from the tilted buckets into the subjacent transversely extending pan 79. The pan 79 is vibrated by the motor 38, and the material in the pan discharges through the diagonal slot 84 into the main storage compartment 15. Free flow of the material is facilitated by the vibration of pan 79 produced by motor 38 by the action of the eccentrically driven arm 100, as above-described. The material, after building up on the conveyor belt 16, operates the probe switch 26 in the manner above-described.

In a preferred embodiment of the invention, the conditions illustrated in FIG. 9 represent the probe 30 in engagement with the top surface of a pile of the product below the upper level limit in main storage compartment 15. Under these conditions the probe switch 26 is opened, and the relay 127 is deenergized, whereby its contacts 129 are conditioned to energize timer 132 and thereby energize "forward" motor controller 60. With this arrangement, the "tracer" assembly 14 would move forwardly over compartment 15 to eventually actuate front limit switch 21, and would then move rearwardly until probe switch 26 recloses responsive to the location of a level of material at or above the upper limit. Energization of relay 127 causes reversal of movement of assembly 14. Deenergization of relay 127 causes resumption of forward movement of assembly 14 after a "dwell" period.

It will thus be seen that after the product builds up on the main conveyor belt 16 to close switch 26, this energizes relay 127, causing reversal of movement of assembly 14 until the probe 30 moves away from the pile of product and switch 26 reopens, causing resumption of forward movement of assembly 14 after a "dwell" period.

As above-explained, the operation of the main conveyor belt 16 is controlled by the photoelectric sensing units 122 and 123 so as to stop the movement of the main conveyor belt when the material discharged into the delivery chute 17 exceeds an upper predetermined limit and to resume movement of the main conveyor belt when the material in the chute 17 drops below a predetermined low limit.

The timer 132 acts to provide a "dwell" period sufficient to add a substantial amount of material to a low area in the main storage compartment 15 before the traveling spreader assembly 14 resumes its forward travel. Wherever the probe 30 senses material at or above the upper level limit, it energizes relay 127 to cause a reversal of movement of the traveling spreader assembly 14. When the probe 30 detects a low region, it causes switch 26 to open and stop the movement of the assembly 14 for a period of time (the "dwell" period of timer 132), after which forward movement of assembly 14 is resumed. The action of the probe 30 and the parts cooperating therewith is of great value especially when material is being passed through the system at a relatively rapid rate wherein occasionally the rate of discharge exceeds the rate of input. The parts thus cooperate to minimize the possibility of the main conveyor belt 16 being left with open spaces thereon.

Figure 3:
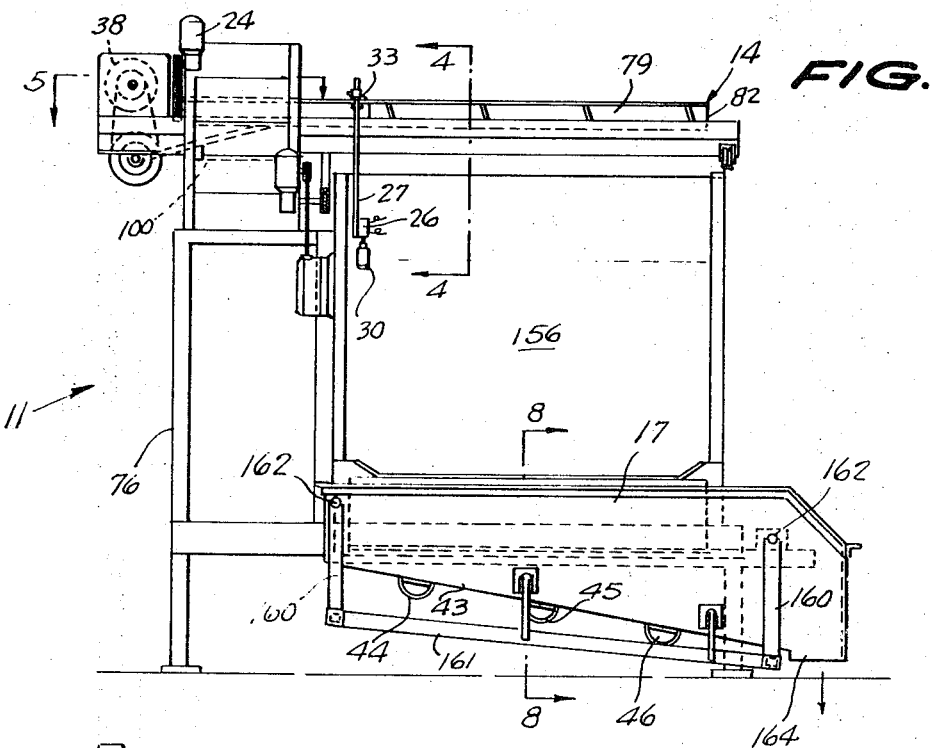
FIG. 3 is an end elevational view of the apparatus of FIGS. 1 and 2.

As above-mentioned the various chute members of the system are preferably resiliently mounted and are provided with vibrating means. Thus, the input chute assembly 13 includes the vibrating means 34 and the transversely extending distributing chute assembly 14 includes the vibrating means comprising the drive motor 38 and associated elements for generating vibratory impulses and delivering same to the connection arm 100 which is fastened to the resiliently mounted pan member 79. The output chute assembly also is resiliently mounted, the chute 17 being resiliently supported on resilient bars 160 secured to and rising from the stationary bottom frame 161, the upstanding bars 160 being located adjacent the respective opposite ends of the outlet chute 17, as shown in FIG. 3. The top ends of the bars 160 are preferably pivotally connected to the sidewall of chute 17 at 162, 162. The inclined outlet chute 17 is preferably formed of suitable relatively flexible material, such as sheet metal, or the like, and may be connected at its inside wall to the framework of the main assembly, as shown in FIG. 8, whereas the outside wall of the outlet delivery chute 17 may be resiliently supported on the upstanding flexible arms 160, 160 in the manner above-described, the inherent flexibility of the chute allowing the chute to vibrate readily when driven by the spaced electric vibrators 44, 45 and 46, or any desired combination of these electrical vibrators. Thus, the material in the delivery chute 17 slides downwardly by gravity and leaves the chute at its downwardly directed outlet, shown at 164 in FIG. 3.

While a specific embodiment of an improved material-conveying assembly has been disclosed in the foregoing description, it will be understood that various modifications within the spirit of the invention may occur to those skilled in the art. Therefore, it is intended that no limitations be placed on the invention except as defined by the scope of the appended claims.

I claim:

1. A material-conveying assembly comprising an elongated main receptacle, an endless belt conveyor forming the bottom of said main receptacle, said main receptacle having a discharge opening at the forward end of said belt conveyor, a delivery chute located to receive material from said forward end of the belt conveyor and arranged to convey said material away from said main receptacle, a bucket conveyor having pivoted buckets and being mounted substantially parallel to and above said main receptacle, transversely arranged distributing chute means underlying said bucket conveyor and overlying said main receptacle, said distributing chute means being apertured to allow material received thereby to drop into said main receptacle, means to move said distributing chute means lengthwise of said main receptacle, cooperating cam means on the distributing chute means and the buckets of the bucket conveyor to rotate each bucket to discharge material from the bucket conveyor onto the distributing chute means responsive to the forward movement of the bucket conveyor over said chute means, material-sensing probe means on the distributing chute means to detect material at a predetermined level in said main receptacle, and means to temporarily stop movement of said distributing chute means responsive to the detection of material at a level below said predetermined level of said probe means.

2. The material-conveying assembly of claim 1, and means to reverse the direction of movement of the distributing chute means responsive to the approach of said distributing chute means to the forward end of the main receptacle.

3. The material-conveying assembly of claim 2, and wherein the distributing chute means is provided with reversible electrical drive means drivingly connected thereto to move it forwardly and rearwardly, means to reversibly energize said drive means, and means to introduce a time delay in the forward energization of said drive means.

4. The material-conveying assembly of claim 3, and material level-sensing means in said delivery chute controlling the operation of said belt conveyor.

5. The material-conveying assembly of claim 4, and wherein said material-sensing means comprises respective photosensitive devices mounted at upper and lower level limits in said delivery chute.

6. The material-conveying assembly of claim 4, and wherein said probe means comprises a depending material-contacting element carried by said distributing chute means and control-switch means operatively coupled to said material-contacting element.

7. A material-conveying assembly comprising an elongated main receptacle, a first conveyor forming the bottom of said main receptacle, said main receptacle having a discharge opening at one end of the first conveyor, a delivery chute located to receive material from said one end of the first conveyor and arranged to convey said material away from said main receptacle, a second conveyor mounted substantially parallel to and above said main receptacle, transversely arranged distributing chute means underlying said second conveyor and overlying said main receptacle, said distributing chute means being apertured to allow material received thereby to drop into said main receptacle, means to move said distributing chute means lengthwise of said main receptacle, cooperating means on the distributing chute means and the second conveyor to discharge material from the second conveyor onto the distributing chute means responsive to the movement of the distributing chute means beneath the second conveyor, material-sensing probe means on the distributing chute means to detect material at a predetermined level in said main receptacle, means to reverse the direction of movement of the distributing chute means responsive to the approach of said distributing chute means to the forward end of the main receptacle, wherein the distributing chute means is provided with reversible electrical drive means drivingly connected thereto to move it forwardly and rearwardly, material-level sensing means in said delivery chute controlling the operation of said first conveyor, said probe means comprising a depending material-contacting element carried by said distributing chute means and control-switch means operatively coupled to said material-contacting element, relay means, an energizing circuit including said control-switch means connected to said relay means, means to energize said reversible distributing chute-drive means in one direction when said relay means is deenergized, and means to energize said reversible distributing chute-drive means in the opposite direction responsive to the energization of said relay means.

8. The material-conveying assembly of claim 7, and wherein the distributing chute means is energized in a forward direction when said relay means is deenergized.

9. The material-conveying assembly of claim 8, and wherein the means to reverse the forward movement of the distributing chute means when it approaches the forward end of the main receptacle comprises means to energize said relay means responsive to the approach of said distributing chute means to said forward end.

10. The material-conveying assembly of claim 9, and wherein the reversible drive means of the distributing chute means comprises respectively a forward energizing circuit connected to said drive means and a reverse energizing circuit connected to said drive means, and means to introduce a time delay in the forward energization of said drive means comprising slow-closing switch means in said forward energizing circuit.

11. The material-conveying assembly of claim 10, and wherein the forward energizing circuit and the reverse energizing circuit have a common branch including an interlock switch, said second conveyor being provided with a drive motor, and means to simultaneously energize said drive motor and close said interlock switch, whereby said forward energizing circuit and reverse energizing circuit cannot be energized unless said last-named drive motor is energized.

12. The material-conveying assembly of claim 9, and wherein said relay means is provided with an energizing circuit including a limit switch in the path of movement of said distributing chute means, said limit switch being located adjacent said forward end of the main receptacle.

13. The material-conveying assembly of claim 7, and wherein said distributing chute means comprises a carriage and an apertured pan member resiliently mounted on said carriage, said carriage being provided with rollers, and stationary track means beneath and parallel to said second conveyor, said rollers supportingly engaging said track means to guide the carriage longitudinally of the main receptacle.

14. The material-conveying assembly of claim 13, and vibrator means mounted on said carriage and operatively connected to said pan member.

15. The material-conveying assembly of claim 14, and wherein said vibrator means comprises a drive motor mounted on said carriage, an eccentric member driven by said motor, and a crank arm drivingly coupling said eccentric member to said pan member.

16. The material-conveying assembly of claim 14, and electrically operated vibrator means connected to said delivery chute.

17. The material-conveying assembly of claim 16, and wherein said last-named vibrator means comprises a plurality of spaced electrical vibrators mounted on the bottom wall of said deliver chute, and means to selectively energize said spaced electrical vibrators.

18. The material-conveying assembly of claim 17, and wherein each electrical vibrator has an energizing circuit including an input voltage-control device, whereby the intensity of operation of said vibrators can be individually controlled.